(12) United States Patent
Li et al.

(10) Patent No.: US 9,766,744 B2
(45) Date of Patent: Sep. 19, 2017

(54) TOUCH DISPLAY PANEL, AND DRIVING METHOD AND DRIVING CIRCUIT FOR THE SAME

(71) Applicants: Shanghai Tianma Micro-Electronics Co., Ltd., Shanghai (CN); Tianma Micro-Electronics Co., Ltd., Shenzhen (CN)

(72) Inventors: Gujun Li, Shanghai (CN); Yungang Sun, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 22 days.

(21) Appl. No.: 14/881,953

(22) Filed: Oct. 13, 2015

(65) Prior Publication Data
US 2016/0291772 A1 Oct. 6, 2016

(30) Foreign Application Priority Data

Apr. 1, 2015 (CN) .......................... 2015 1 0152831

(51) Int. Cl.
*G06F 3/041* (2006.01)
*G06F 3/044* (2006.01)
(52) U.S. Cl.
CPC ............ *G06F 3/0416* (2013.01); *G06F 3/044* (2013.01); *G06F 2203/04103* (2013.01)
(58) Field of Classification Search
CPC ................................ G06F 3/0412; G06F 3/044
See application file for complete search history.

(56) References Cited

U.S. PATENT DOCUMENTS

| 2004/0189585 A1* | 9/2004 | Moon | G11C 19/28 345/100 |
| 2010/0328291 A1* | 12/2010 | Ishizaki | G06F 3/0412 345/211 |

(Continued)

FOREIGN PATENT DOCUMENTS

| CN | 102375258 B | 1/2014 |
| CN | 104020891 A | 9/2014 |

OTHER PUBLICATIONS

Chinese Application No. 201510152831.5, First Office Action issued Apr. 1, 2017.

*Primary Examiner* — Kevin M Nguyen
(74) *Attorney, Agent, or Firm* — Alston & Bird LLP (57) ABSTRACT

It is provided a touch display panel, and a driving method and a driving circuit for the touch display panel. The touch display panel includes: a common electrode including multiple common electrode units disposed in rows and columns; multiple switch elements electrically connected to the common electrode units; multiple first signal lines, where each first signal line is electrically connected to at least two switch elements located in different columns, and multiple first signal lines are used to turn on or turn off the switch elements electrically connected to the first signal lines; and multiple second signal lines, where each second signal line is electrically connected to at least two switch elements located in different rows, and the multiple second signal lines are used to provide a driving signal to a common electrode unit electrically connected to a turned-on switch element.

12 Claims, 6 Drawing Sheets

(56) References Cited

U.S. PATENT DOCUMENTS

2012/0038585 A1   2/2012   Kim
2013/0044092 A1*  2/2013   Park .................... G06F 3/0412
                                                        345/207
2016/0246408 A1   8/2016   Wang et al.

* cited by examiner

TOUCH DISPLAY PANEL, AND DRIVING METHOD AND DRIVING CIRCUIT FOR THE SAME

CROSS REFERENCE OF RELATED APPLICATION

The present application claims the priority to Chinese Patent Application No. 201510152831.5, entitled "TOUCH DISPLAY PANEL, AND DRIVING METHOD AND DRIVING CIRCUIT FOR THE SAME", filed on Apr. 1, 2015 with the State Intellectual Property Office of the Peoples Republic of China, which is incorporated herein by reference in its entirety.

BACKGROUND

With the development of display technology, more and more display panels are integrated with a touch function based on a mutual-capacitive touch technology or a self-capacitive touch technology. As compared with the mutual-capacitive touch technology, the self-capacitive touch technology is more applicable to light and thin display panels since only one layer of touch electrodes are needed.

Currently, in a self-capacitive touch display panel, a common electrode in the display panel is divided into multiple block-shaped electrodes and is driven in a time-division manner, and the common electrode further serves as touch electrodes, which further reduces thickness of the display panel, improves production efficiency and lowers production cost.

However, in the self-capacitive touch display panel, each block-shaped electrode needs to be connected to a driving circuit via a single electrode lead, to ensure the touch sensitivity of the display panel. In this case, there are multiple electrode leads in the display panel. Particularly, the larger the size of the display panel is, the more the electrode leads in the display panel are. For example, if the display panel includes block-shaped electrodes arranged in N rows and M columns, there are N*M electrode leads correspondingly; here, M and N are integers larger than 1. Taking a 5-inch display panel as an example, 448 leads are needed. Therefore, the development of the self-capacitive touch display panel is limited greatly.

BRIEF DESCRIPTION OF THE DRAWINGS

Drawings to be used in the description of embodiments or the conventional technology are described briefly as follows, so that technical solutions according to the embodiments of the present disclosure or according to the conventional technology may become clearer. It is obvious that the drawings in the following description only illustrate some embodiments of the present application. For those skilled in the art, other drawings may be obtained according to these drawings without any creative work.

DETAILED DESCRIPTION

The technical solutions according to embodiments of the present disclosure are described clearly and completely hereinafter in conjunction with the drawings. It is obvious that the described embodiments are only a few rather than all of the embodiments of the present application. Any other embodiments obtained by those skilled in the art based on the embodiments in the present disclosure without any creative work fall in the scope of the present disclosure.

As described in the background, there are lots of wires in the conventional self-capacitive touch display panel, which greatly restricts the development of the touch display panel.

In view of the above, a touch display panel is provided according to an embodiment of the present disclosure.

Figure 1:
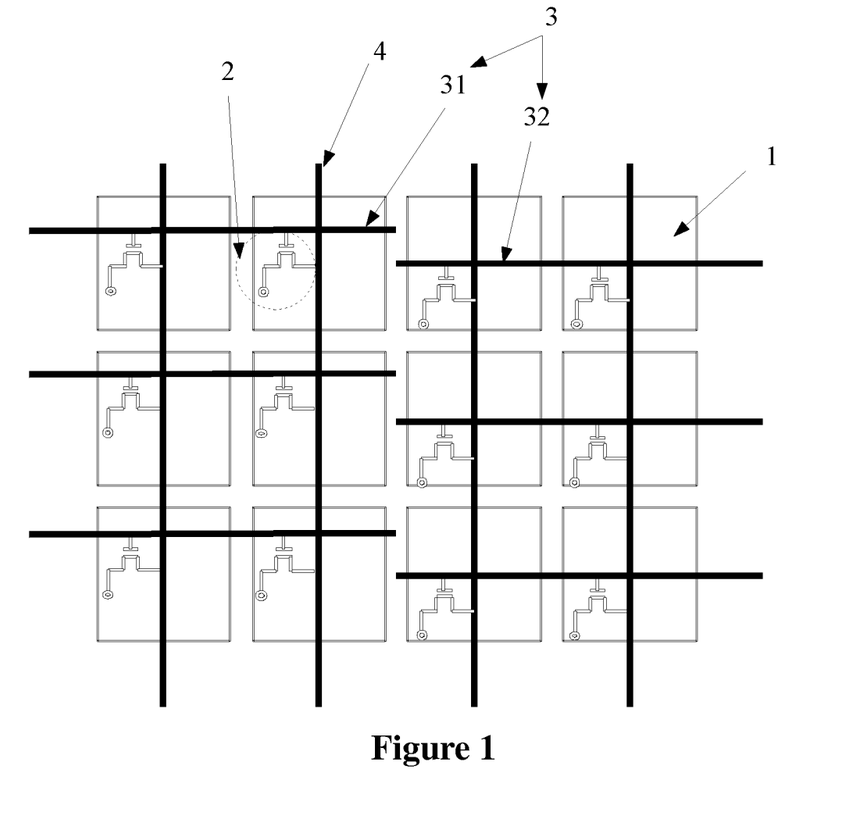
FIG. 1 is a schematic structural diagram of a touch display panel according to an embodiment of the present disclosure.

As shown in FIG. 1, touch display panel includes:

a common electrode, which includes multiple common electrode units 1 disposed in rows and columns, where the common electrode unit 1 serve as the common electrode in a display phase and serves as touch electrodes in a touch phase;

multiple switch elements 2, wherein an one-to-one correspondence exists between the switch elements 2 and the common electrode units 1, and each switch element 2 is electrically connected to a common electrode unit 1 corresponding to the switch element 2;

multiple first signal lines 3, wherein each first signal line 3 is electrically connected to at least two switch elements 2 located in different columns to reduce the number of the first signal lines 3 and to avoid low touch sensitivity due to a touch blind zone occurring in the touch phase; and multiple second signal lines 4, wherein each second signal line 4 is electrically connected to at least two switch elements 2 located in different rows to reduce the number of the second signal lines 4 and to avoid low touch sensitivity due to a touch blind zone occurring in the touch phase;

where the first signal lines 3 are for turning on or turning off the switch elements 2, and the second signal lines 4 are for providing a driving signal to a common electrode unit 1 electrically connected to a turned-on switch element 2.

It should be noted that, in an embodiment of the present disclosure, in a display phase, driving signals are simultaneously provided to the switch elements 2 via the multiple first signal lines 3 to turn on the switch elements 2, and common voltage signals are simultaneously provided, via the multiple second signal lines 4, to the common electrode units 1 electrically connected to turned-on switch elements 2, to achieve a display function. In a touch phase, driving signals are provided via the respective first signal lines 3 row by row, to successively turn on the switch elements 2 electrically connected to the respective first signal lines 3, and touch signals are provided, via the second signal lines 4, to the common electrode units 1 electrically connected to turned-on switch elements 2, to achieve a touch detection.

Based on the above embodiment, in an embodiment of the present disclosure, the switch elements 2 are thin-film transistors. Each thin-film transistor includes a first electrode, a second electrode and a gate electrode. In the embodiment, the first signal line 3 is electrically connected to the gate electrode of the thin-film transistor and the second signal line 4 is electrically connected to the second electrode of the thin-film transistor. It should be noted that, in an example of the embodiment, the first electrode is a source electrode and the second electrode is a drain electrode. In another example of the embodiment, the first electrode is a drain electrode and the second electrode is a source electrode, which is not limited herein and depends on actual cases.

Based on the above embodiments, in a preferred embodiment of the present disclosure, the common electrode includes common electrode units 1 arranged in N rows and M columns. Here, M and N are integers larger than 1. In an example of the embodiment, each of the multiple first signal lines 3 includes a first sub-line 31 and a second sub-line 32. Gates electrodes of M thin-film transistors located in different columns are electrically connected with the first sub-line 31 and the second sub-line 32, as shown in FIG. 1. In another example of the embodiment, each first signal line 3 is electrically connected to gate electrodes of M thin-film transistors located in different columns, as shown in FIG. 2, so that the number of the first signal lines 3 is reduced maximally, which is not limited herein and depends on actual cases.

Figure 2:
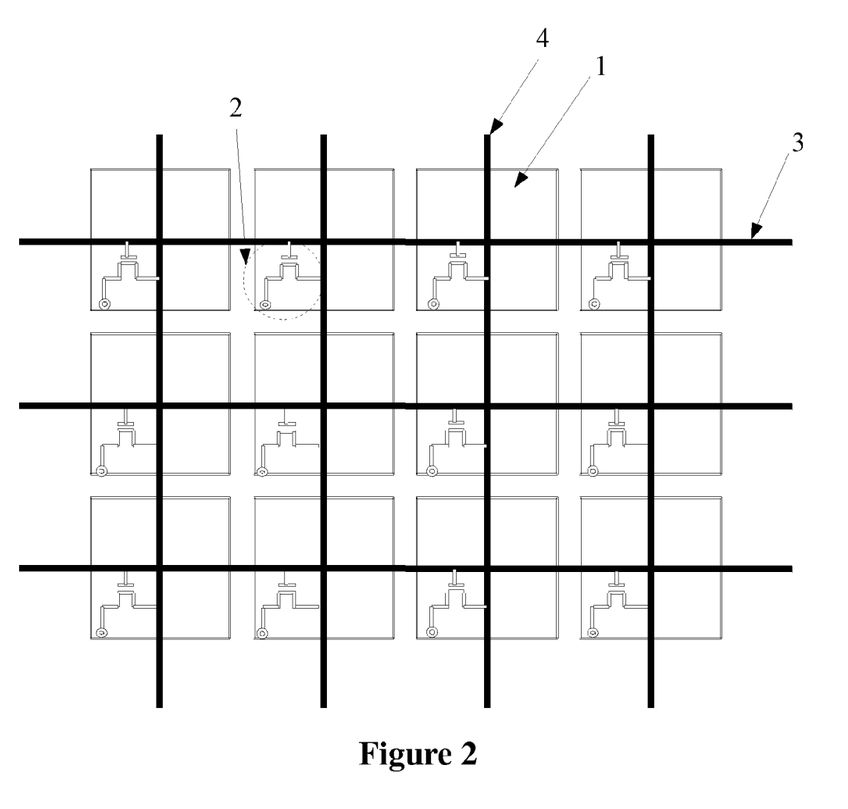
FIG. 2 is a schematic structural diagram of a touch display panel according to an embodiment of the present disclosure.

In a case that each first signal line 3 is electrically connected to the gate electrodes of M thin-film transistors located in different columns, in a preferred embodiment of the present disclosure as shown in FIG. 2, each first signal line 3 is electrically connected to gate electrodes of M thin-film transistors located in the same row, to reduce the length of each first signal line 3. In another embodiment of the present disclosure, each first signal line 3 may be electrically connected to gate electrodes of M thin-film transistors which are not all located in the same row, as shown in FIG. 3, which is not limited herein and depends on actual cases.

Based on any one of the above embodiments, in an embodiment of the present disclosure, the common electrode includes common electrode units arranged in N rows and M columns, and each second signal line 4 is electrically connected to second electrodes of N thin-film transistors, to reduce the number of the second signal lines 4 maximally. Here, M and N are integers larger than 1.

Figure 3:
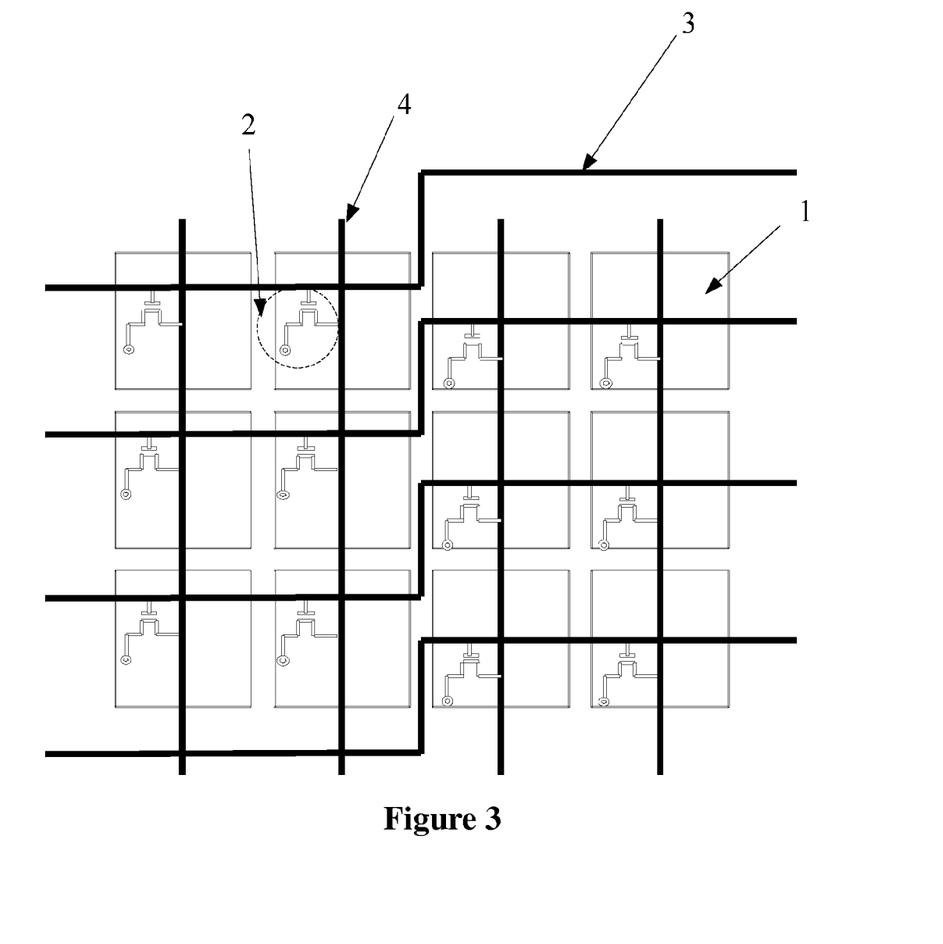
FIG. 3 is a schematic structural diagram of a touch display panel according to an embodiment of the present disclosure.

Based on the above embodiments, in an embodiment of the present disclosure, each second signal line 4 is electrically connected to second electrodes of N thin-film transistors located in the same column, as shown in FIGS. 2 and 3, to reduce the length of each second signal line 4. In another embodiment of the present disclosure, the second signal line 4 may be electrically connected to second electrodes of N thin-film transistors which are not all located in the same column, which is not limited herein and depends on actual cases.

Taking a 5-inch touch display panel including 28 rows and 16 columns as an example, in a case that each first signal line is electrically connected to 16 thin-film transistors and each second signal line is electrically connected to 28 thin-film transistors, the total number of the first signal lines 3 and the second signal lines 4 in the touch display panel is 44. As compared with the conventional technologies in which each common electrode unit is electrically connected to a single lead (requiring a total of 448 leads), the number of leads in the embodiment is less than one tenth of the number of leads in the conventional technologies. Therefore, the number of leads in the touch display panel is reduced greatly.

It can be seen from the above that, in the touch display panel according to the embodiments of the present disclosure, each first signal line 3 is electrically connected to at least two switch elements 2 located in different columns and each second signal line 4 is electrically connected to at least two switch elements 2 located in different rows, rather than that each common electrode unit 1 corresponding to the switch element 2 is electrically connected to a single signal line. Hence, the number of leads in the touch display panel is reduced which is advantageous over conventional touch display technology.

Correspondingly, a driving method for a touch display panel is further provided according to an embodiment of the present disclosure. The driving method is applied in the touch display panel according to any one of the above embodiments.

The driving method may include:
providing driving signals to the multiple first signal lines 3 simultaneously to turn on the multiple switch elements and providing common voltage signals to the multiple second signal lines 4 simultaneously, in a display phase, to achieve a display function; and
providing driving signals to the multiple first signal lines 3 row by row to successively turn on switch elements 2 electrically connected to the first signal lines 3, and providing touch signals to the multiple second signal lines 4 simultaneously, in a touch phase, to achieve a touch function.

It should be noted that, in an embodiment of the present disclosure, the providing the driving signals to the multiple first signal lines 3 row by row may include providing the driving signals to the multiple first signal lines 3 in turn from a top row of first signal line to a bottom row of first signal line, or in turn from a bottom row of first signal line to a top row of first signal line, or in other preset orders, which is not limited herein, as long as it is ensured that one driving signal is provided to only one first signal line 3 at any time instant during the touch phase.

No touch blind zone is formed and the touch sensitivity is not reduced since the switch elements 2 in the same row are turned on simultaneously and a case that at least two switch elements 2 in the same column are turned on simultaneously does not exist. Based on the above embodiments, in an embodiment of the present disclosure, as shown in FIG. 1, each first signal line 3 includes a first sub-line 31 and a second sub-line 32. In a case that all of the switch elements 2 electrically connected to the first sub-line 31 and the second sub-line 32 are located in different columns, it is preferred to provide driving signals to the first sub-line 31 and the second sub-line 32 simultaneously in the touch phase to shorten a scanning period in the touch phase.

Based on the above embodiments, in an embodiment of the present disclosure, if each first signal line 3 is electrically connected to the switch elements 2 in the same row, it is preferred to provide driving signals to the multiple first signal lines 3 row by row to turn on the switch elements 2 row by row in the touch phase. It should be noted that, in an embodiment of the present disclosure, the switch elements 2 in respective rows may be turned on from a top row to a bottom row, or from a bottom row to a top row, or in other preset orders, which is not limited herein and depends on actual cases.

In addition, a driving circuit for a touch display panel is provided according to an embodiment of the present disclosure. The driving circuit is applied to the touch display panel according to any one of the above.

Figure 4:
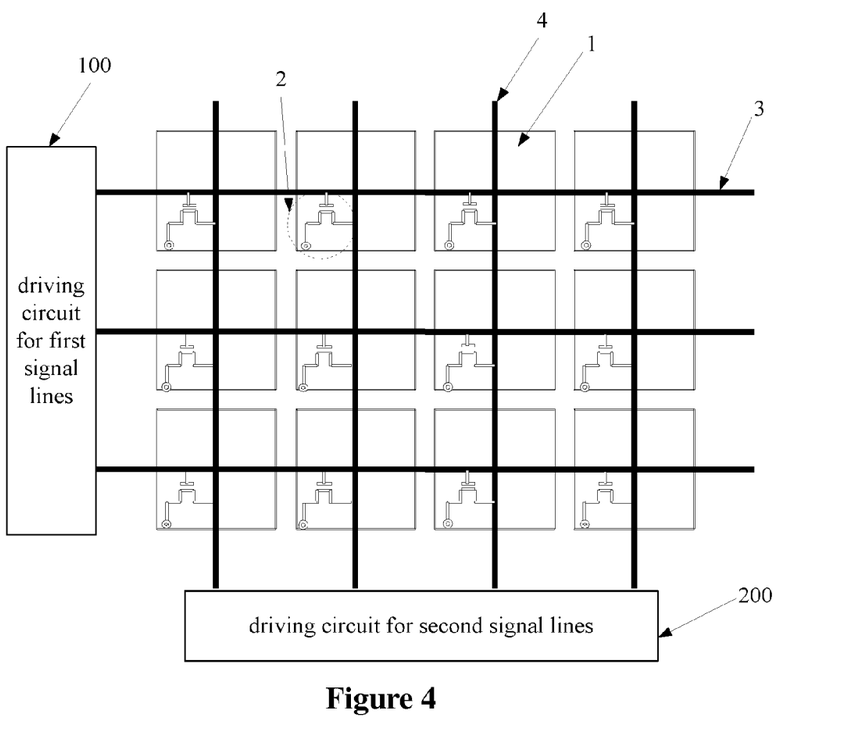
FIG. 4 is a schematic diagram showing electrical connection of a driving circuit for a touch display panel according to an embodiment of the present disclosure.

As shown in FIG. 4, the driving circuit may include:
a driving circuit 100 for first signal lines, configured to simultaneously provide driving signals to the multiple first signal lines 3 to turn on the multiple switch elements 2 in a display phase, and to provide driving signals to the multiple first signal lines 3 row by row to turn on switch elements 2 electrically connected to the multiple first signal lines 3 row by row in a touch phase; and a driving circuit 200 for second signal lines, configured to provide common voltage signals to the multiple second signal lines 4 simultaneously in the display phase and to provide touch signals to the multiple second signal lines 4 simultaneously in the touch phase.

Figure 5:
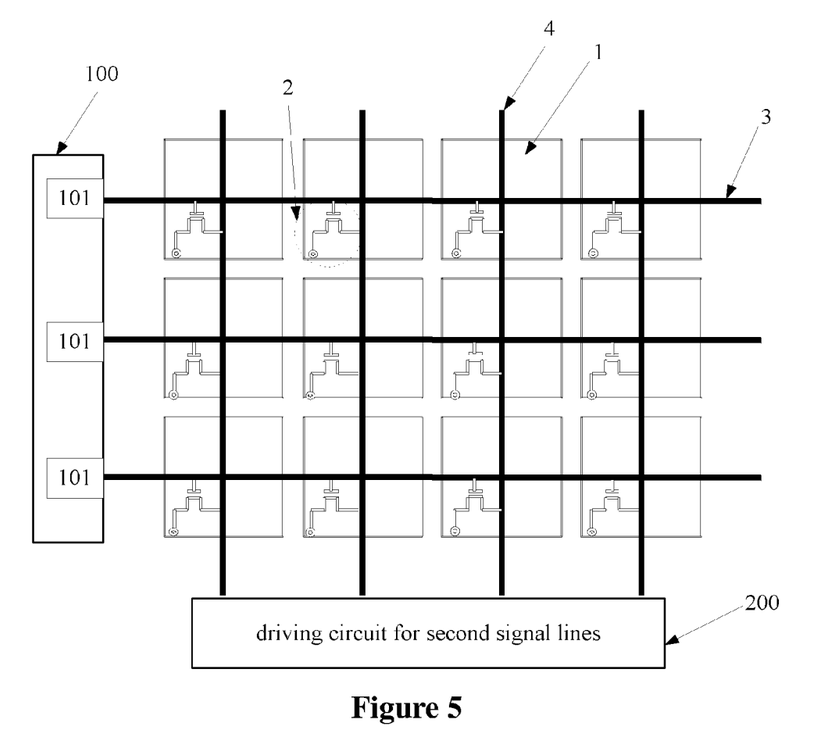
FIG. 5 is a schematic structural diagram of a first driving circuit of a driving circuit for a touch display panel according to an embodiment of the present disclosure.

Based on the above embodiments, in an embodiment of the present disclosure, as shown in FIG. 5, the driving circuit 100 for the first signal lines includes multiple first signal sources 101. A one-to-one correspondence exists between the first signal sources 101 and the first signal lines 3 and each first signal source provides a driving signal to the first signal line 3 electrically connected to the first signal source. It should be noted that, in an embodiment of the present disclosure, in the touch phase, the multiple first signal sources 101 successively provide the driving signals to the first signal lines 3 respectively electrically connected to the multiple first signal sources 101. That is, one and only one first signal source 101 provides a driving signal to the first signal line 3 electrically connected to the first signal source 101 at any time instant in the touch phase, which ensures that one and only one first signal line 3 provides a driving signal to a switch element 2 electrically connected to the first signal line 3 at any time instant in the touch phase, thereby avoiding a reduced touch sensitivity due to a touch blind zone.

Figure 6:
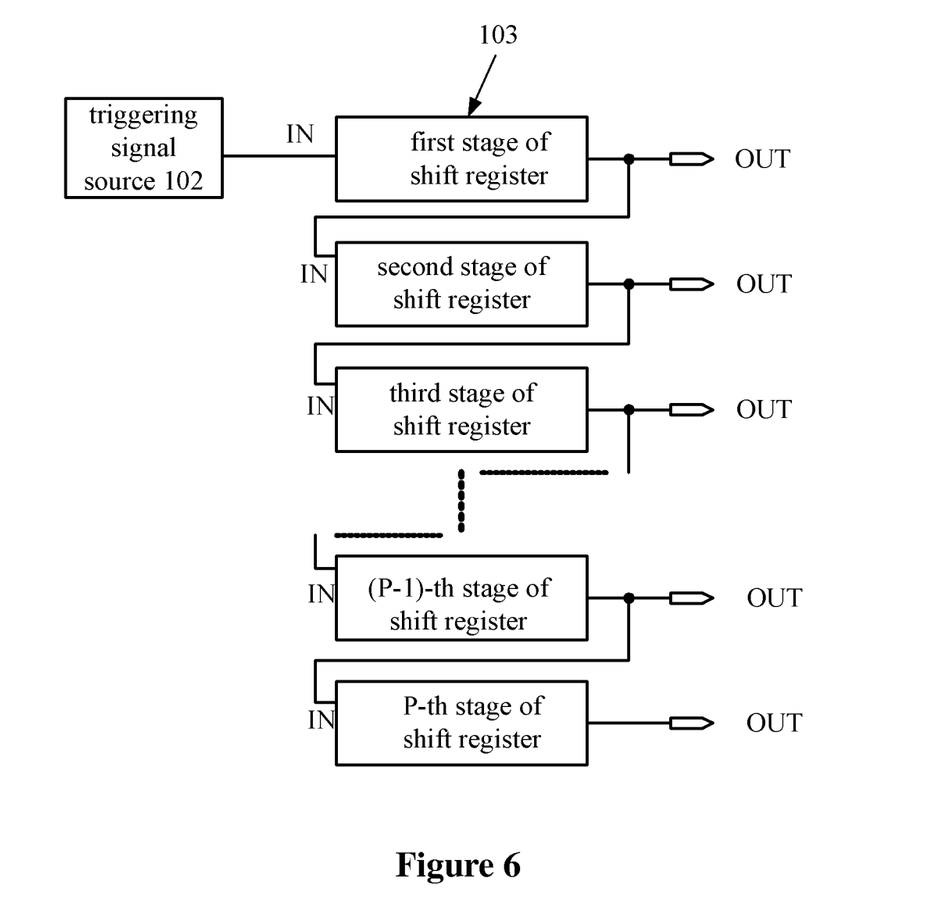
FIG. 6 is a schematic structural diagram of a first driving circuit of a driving circuit for a touch display panel according to another embodiment of the present disclosure.

In another embodiment of the present disclosure, as shown in FIG. 6, the driving circuit 100 for the first signal lines includes a triggering signal source 102, and a control circuit including multiple shift registers 103. The control circuit includes a first stage of shift register to a P-th stage of shift register, where P is the number of the first signal lines 3 in the touch display panel. An input terminal of the first stage of shift register is electrically connected to the triggering signal source 102, the first stage of shift register operates in response to a triggering signal from the triggering signal source 102 and provides a driving signal to a first signal line 3 electrically connected to the first stage of shift register. An output terminal of an I-th stage of shift register is electrically connected to an input terminal of an (I+1)-th stage of shift register to trigger the (I+1)-th stage of shift register to operate, and the I-th stage of shift register provides a driving signal to a first signal line 3 electrically connected to the I-th stage of shift register; where I is not less than 1 and is less than P. Since a certain time delay exists between a signal reception at the input terminal of one shift register and a signal output at the output terminal of the shift register, in an embodiment of the present disclosure, driving signals may be provided to the first signal lines 3 row by row by using a current shift register to trigger a next stage of shift register to operate, and the switch elements 2 electrically connected to the first signal lines 3 are turned on row by row. In another embodiment of the present disclosure, the driving signals may be provided to the first signal lines 3 row by row in other ways, to turn on the switch elements 2 electrically connected to the first signal lines 3 row by row, which are not limited herein and depend on actual cases.

In summary, in the touch display panel, and the driving method and driving circuit for the touch display panel according to the embodiments of the present disclosure, each first signal line 3 is electrically connected to at least two switch elements 2 located in different columns and each second signal line 4 is electrically connected to at least two switch elements 2 located in different rows, rather than that each common electrode unit 1 corresponding to one switch element 2 is electrically connected to a single signal line. Hence, the number of leads in the touch display panel is reduced and the problem of lots of leads in the touch display panel is alleviated.

The above parts are described herein in a progressive manner, with the emphasis of each part on the difference from the other parts. For the same or similar portions between the parts, one part can be understood with reference to the other parts.

With the above descriptions of the disclosed embodiments, the skilled in the art may practice or use the present disclosure. Various modifications to the embodiments are apparent for the skilled in the art. The general principle suggested herein can be implemented in other embodiments without departing from the spirit or scope of the disclosure. Therefore, the present disclosure should not be limited to the embodiments disclosed herein, but has the widest scope that is in conformity with the principle and the novel features disclosed herein.

The invention claimed is:

1. A touch display panel, comprising:
    a common electrode comprising a plurality of common electrode elements arranged in rows and columns;
    a plurality of switch elements, wherein an one-to-one correspondence exists between the switch elements and the common electrode elements, and each switch element is electrically connected to one common electrode element corresponding to the each switch element;
    a plurality of first signal lines, wherein each first signal line is electrically connected to at least two switch elements located in different columns, and the plurality of first signal lines are configured to turn on or turn off the switch elements electrically connected to the first signal lines; and
    a plurality of second signal lines, wherein each second signal line is electrically connected to at least two switch elements located in different rows, and the plurality of second signal lines are configured to provide a driving signal to a common electrode element electrically connected to a turned-on switch element.

2. The touch display panel according to claim 1, wherein the switch elements are thin-film transistors and each thin-film transistor comprises a first electrode, a second electrode and a gate electrode.

3. The touch display panel according to claim 2, wherein the common electrode comprises common electrode elements arranged in N rows and M columns and each first signal line is electrically connected to gate electrodes of M thin-film transistors.

4. The touch display panel according to claim 3, wherein each first signal line is electrically connected to gate electrodes of M thin-film transistors which are located in the same row.

5. The touch display panel according to claim 4, wherein each second signal line is electrically connected to second electrodes of N thin-film transistors.

6. The touch display panel according to claim 5, wherein each second signal line is electrically connected to second electrodes of N thin-film transistors which are located in the same column.

7. A driving method for a touch display panel, wherein the touch display panel, comprises:
    a common electrode comprising a plurality of common electrode elements arranged in rows and columns;
    a plurality of switch elements, wherein an one-to-one correspondence exists between the switch elements and the common electrode elements, and each switch element is electrically connected to one common electrode element corresponding to the each switch element;

a plurality of first signal lines, wherein each first signal line is electrically connected to at least two switch elements located in different columns, and plurality of first signal lines are configured to turn on or turn off the switch elements electrically connected to the first signal lines; and a plurality of second signal lines, wherein each second signal line is electrically connected to at least two switch elements located in different rows, and the plurality of second signal lines are configured to provide a driving signal to a common electrode element electrically connected to a turned-on switch element; and wherein the method comprises:

providing, in a display phase, driving signals to the plurality of first signal lines simultaneously to turn on the plurality of switch elements;

providing, in the display phase, common voltage signals to the plurality of second signal lines simultaneously to achieve a display function; and providing, in a touch phase, driving signals to the plurality of first signal lines row by row to turn on switch elements electrically connected to the first signal lines row by row;

providing, in the touch phase, touch signals to the plurality of second signal lines simultaneously to achieve a touch function.

8. The driving method for the touch display panel according to claim 7, wherein the first signal line comprises a first sub-line and a second sub-line, and driving signals are provided to the first and second sub-lines simultaneously in the touch phase in a case that the switch elements electrically connected to the first sub-line and the switch elements electrically connected to the second sub-line are located in different columns.

9. The driving method for the touch display panel according to claim 7, wherein in a case that each first signal line is electrically connected to switch elements located in the same row, driving signals are provided to the plurality of first signal lines row by row to turn on switch elements row by row in the touch phase.

10. A driving circuit for a touch display panel, wherein the touch display panel comprises:

a common electrode comprising a plurality of common electrode elements arranged in rows and columns;

a plurality of switch elements, wherein an one-to-one correspondence exists between the switch elements and the common electrode elements, and each switch element is electrically connected to one common electrode element corresponding to the each switch element;

a plurality of first signal lines, wherein each first signal line is electrically connected to at least two switch elements located in different columns, and plurality of first signal lines are configured to turn on or turn off the switch elements electrically connected to the first signal lines; and a plurality of second signal lines, wherein each second signal line is electrically connected to at least two switch elements located in different rows, and the plurality of second signal lines are configured to provide a driving signal to a common electrode element electrically connected to a turned-on switch element;

wherein the driving circuit comprises:

a driving circuit for first signal lines, configured to provide driving signals to the plurality of first signal lines to turn on the plurality of switch elements in a display phase, and to provide driving signals to the plurality of first signal lines row by row to turn on switch elements electrically connected to the first signal lines row by row in a touch phase; and a driving circuit for second signal lines, configured to provide common voltage signals to the plurality of second signal lines simultaneously in the display phase and to provide touch signals to the plurality of second signal lines simultaneously in the touch phase.

11. The driving circuit for the touch display panel according to claim 10, wherein the driving circuit for the first signal lines comprises:

a plurality of first signal sources, wherein there is a one-to-one correspondence between the plurality of first signal sources and the first signal lines, and the first signal sources are configured to provide driving signals to the first signal lines electrically connected to the first signal sources.

12. The driving circuit for the touch display panel according to claim 10, wherein the driving circuit for the first signal lines comprises:

a triggering signal source; and a control circuit, comprising a first stage of shift register to a P-th stage of shift register, wherein P is the number of the first signal lines in the touch display panel, wherein an input terminal of the first stage of shift register is electrically connected to the triggering signal source, the first stage shift of register operates in response to a triggering signal from the triggering signal source and provides a driving signal to a first signal line electrically connected to the first stage of shift register; and an output terminal of an I-th stage of shift register is electrically connected to an input terminal of an (I+1)-th stage of shift register to trigger the (I+1)-th stage of shift register to operate, and the I-th stage of shift register provides a driving signal to a first signal line electrically connected to the I-th stage of shift register; where I is not less than 1 and less than P.

* * * * *